United States Patent [19]

Daab

[11] Patent Number: 4,470,107
[45] Date of Patent: Sep. 4, 1984

[54] DIGITAL REGULATING AND/OR CONTROL SYSTEM

[75] Inventor: Heinz Daab, Darmstadt, Fed. Rep. of Germany

[73] Assignee: Honeywell GmbH, Offenbach, Fed. Rep. of Germany

[21] Appl. No.: 368,613

[22] Filed: Apr. 15, 1982

[30] Foreign Application Priority Data

Apr. 25, 1981 [DE] Fed. Rep. of Germany ....... 3116549

[51] Int. Cl.$^3$ .............................................. G05B 15/02
[52] U.S. Cl. .................................... 364/140; 364/130; 364/200; 364/900; 364/191
[58] Field of Search ........ 364/130, 140, 200 MS File, 364/900 MS File, 191

[56] References Cited

U.S. PATENT DOCUMENTS

| | | | |
|---|---|---|---|
| 4,063,221 | 12/1977 | Watson et al. | 364/900 |
| 4,078,251 | 3/1978 | Hamilton | 364/900 X |
| 4,100,606 | 7/1978 | Brantingham | 364/900 |
| 4,145,751 | 3/1979 | Carlow et al. | 364/900 |

Primary Examiner—Jerry Smith
Assistant Examiner—Allen MacDonald
Attorney, Agent, or Firm—Trevor B. Joike

[57] ABSTRACT

For the implementation of a regulating and/or control system under use of a microprocessor, the system first is arranged column by column and line by line in a functional diagram. The input values of the system are written in an X-register line by line. Also, parameters are written line by line and column by column into a parameter register. An interpreting computer combines line by line and column by column the input values, respectively, the parameters with the predetermined function with the computer being instructed by a program stored in a configurator. The output values of the interpreting computer per column are written line by line in a Y-register. The contents of the Y-register is transferred back into the X-register if the maximum number of lines of the respective column is run through and the maximum number of columns is not yet reached. On the other hand, the contents of the Y-register is delivered as an output if the maximum number of lines of the respective column is run through and the maximum number of lines is reached.

14 Claims, 6 Drawing Figures

DIGITAL REGULATING AND/OR CONTROL SYSTEM

BACKGROUND OF THE INVENTION

The present invention relates to a digital regulating and/or control system.

From the technical journal "Elektronik", 1976, Vol. 3, pp. 87–89, as well as from Vol. 4 of the same journal, pp. 63–68, it is known to implement a digital control by means of microprocessors. Due to an inputted program, the microprocessor after analog/digital conversion of the input values performs predetermined control algorithms in order to supply a controller output to a final control element after digital/analog converting that output. For each other control algorithm another program must be written which may be normally only done by a person skilled in the art of programming. Any changing of the control function in the field is difficult to achieve by an operator without professional knowledge.

SUMMARY OF THE INVENTION

The present invention facilitates the initial programming and the field reprogramming of a microprocessor based temperature control system while at the same time allowing easy and efficient use of that system. According to the present invention, input values such as space temperature, outside temperature and a low limit temperature are stored line by line while at the same time various predetermined as well as variable parameters are stored both line by line and column by column. The microprocessor system then performs in a column by column fashion various functions on these inputs and parameters until a final result, which can be used for control purposes, is obtained. The programming of such a system is, therefore, made easier because any program can be generated a column at a time until a complete system is designed. The programmer can add or delete functions as the system requires and the program, once it has been installed in a system in the field, can be easily reprogrammed by changing instruction steps in the columns without requiring a complete reprogramming of the entire system.

Accordingly, the invention relates to a digital temperature regulating and/or control microprocessor system including an X-register for storing line by line initial input values one of which is space temperature, a parameter register for storing predetermined and variable parameters line by line and column by column, an interpreting computer for combining line by line and column by column the input values and the parameters according to predetermined functions by means of a program stored in a configurator, a Y-register for storing on a column basis output values from the interpreting computer line by line, wherein the Y-register contents are shifted back into the X-register if the maximum number of lines of each column is run through and if the maximum number of columns is not yet reached and wherein the contents of the Y-register are delivered to an output if the maximum number of lines of the respective column is run through and the maximum number of columns is reached.

BRIEF DESCRIPTION OF THE DRAWINGS

With reference to an embodiment shown in the figures of the attached drawings, the invention in the following shall be explained in detail. The drawings shows.

DETAILED DESCRIPTION

Figure 1:
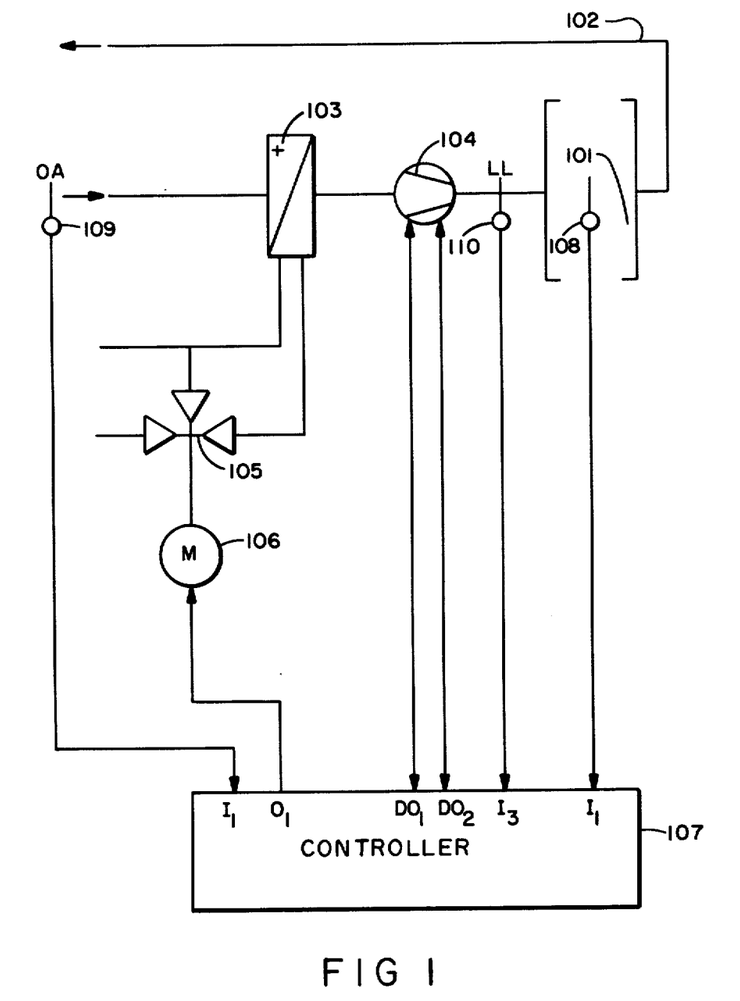
FIG. 1: A block diagram of a space temperature control implemented by the system according to the invention.

FIG. 1 shows in a simplified diagram a temperature control for space 101. To space 101 heating or cooling air as a function of the control is applied via air duct 102. The supply of air takes place via heat exchanger 103 and fan 104. To heat exchanger 103 a heating or cooling fluid is applied via mixing valve 105, whereat servomotor 106 adjusts mixing valve 105. Regulating and control unit 107 is supplied with input values. These input values represent the space temperature measured by sensor 108, the outside air (OA) temperature measured by sensor 109 and limit (LL) temperature measured by sensor 110 in the air duct. As a function of these input signals and a rated value which may be adjusted in a manner not shown, regulating control unit 107 produces an analog output signal 01 for servomotor 106 as well as two staggered-in-time switching signals D01 and D02 for the two steps of fan 104.

Figure 2:
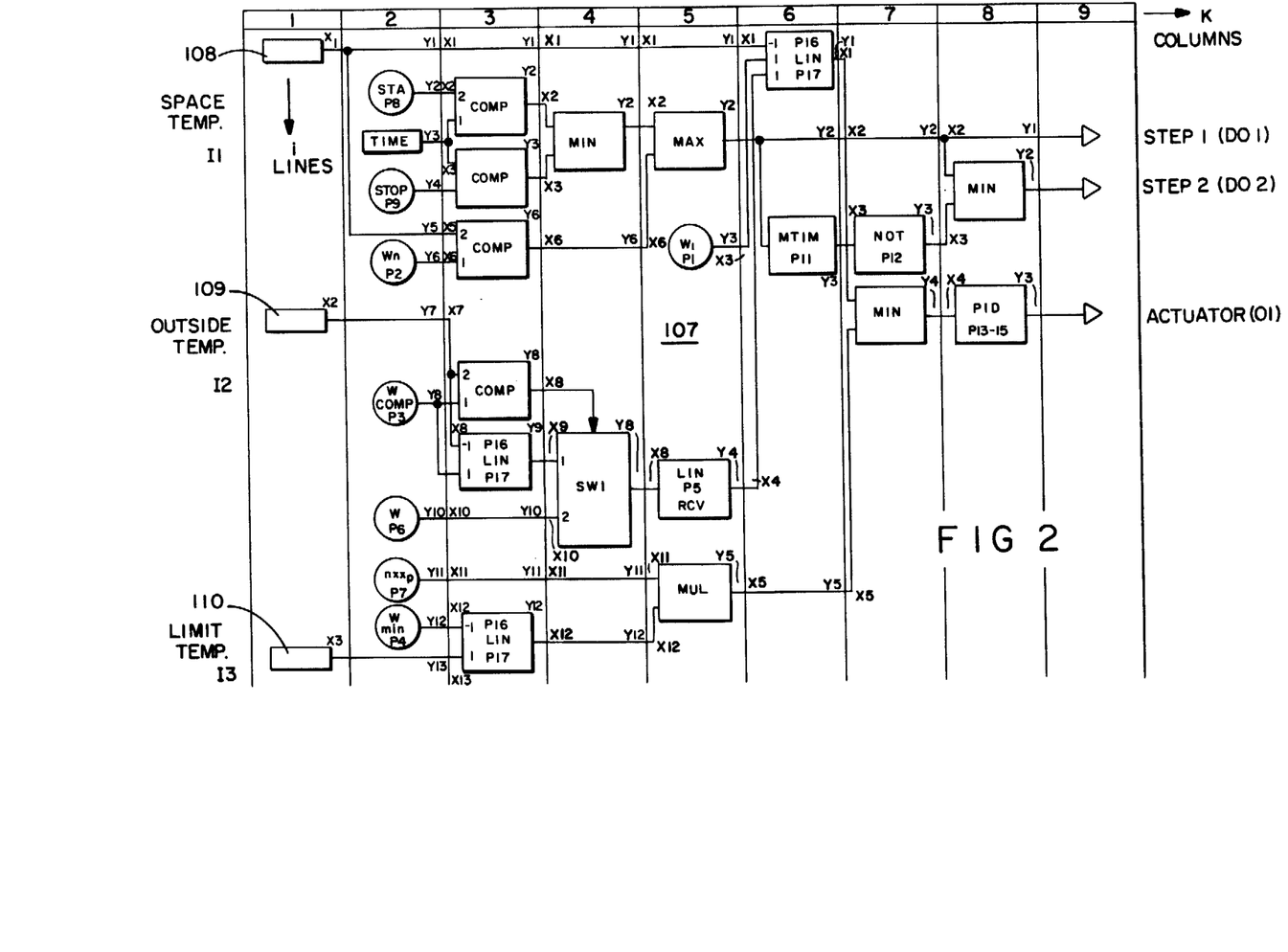
FIG. 2: A functional diagram listed in columns and lines for the space temperature control according to FIG. 1.

FIG. 2 shows a functional diagram of temperature control 107 according to FIG. 1 arranged in k columns and i lines, wherein the shown circles indicate adjustable parameters and the shown rectangles indicate certain functions. The functions may or may not depend on time. The outputs yn of each column at the same time form the inputs xn of the adjacent column.

In column 1 are shown temperature responsive resistors 108, 109 and 110 sensing the different temperatures which form the variable input values. In column 9 the values D01, D02 and 01 are present as output values.

Before describing in detail the implementation of the functional diagram of the space temperature control by means of an adequately configurated microprocessor under reference to a program as well as to a flow chart, the different functions of the space temperature control shall be explained in brief with reference to FIG. 2.

1. Night Control Function—During night operation, the fan normally is switched off. However, a certain minimum temperature should be maintained also during night operation. As long as the time given by the time function "TIME" does not fall below the value given by the parameter P9, the output value Y3 in column 3 takes the low level and the output value Y2 in column 4 takes the same value. If the space temperature is greater than the allowable night temperature WN, adjustable by the parameter P2, the output value Y6 in column 3 also takes the low level so that the fan is totally switched off. However, if the space temperature falls below the adjusted allowable night temperature WN, the ouput value Y2 in column 5 takes the high level and step 1 of the fan D01 is switched on. At the same time, that value starts a timer MTIM. If the difference between the parameter P12 and the time given by the timer which is monitored by the function element NOT becomes greater than zero, then the output value Y2 in column 8 takes the high level and step 2 of the fan D02 is started.

2. Outside Temperature Compensation—The outside temperature is compared with the compensation start point given by parameter P3. If the outside temperature exceeds the start point, then the output values Y8 in columns 3 and 4 show the value zero, the parameter P6 is not active and the control point corresponds to the value given by the parameter P1.

If the outside temperature is below the compensation start point, then function element SWI switches its input 1 to the output Y8 in column 4. Herewith the difference between the outside temperature and the start point temperature is available at output Y8 in column 4. By multiplication with parameter P5 in function element LIN, the control point in column 6 is shifted to the desired value.

3. Lower Limit Function—The minimum temperature given by the parameter P4 is compared with the air temperature in the duct. The temperature difference is multiplicated with the proportional band given by the parameter P7 and the resulting signal is applied to the minimum selector MIN in column 7. The lower signal either from the compensated space temperature loop or from the loop for the lower limit temperature, therefore, acts upon the PID control loop.

4. Control—With respect to the controller, itself, the function element LIN in column 6, compares the rated value given by the parameter P1 and the control point shift signal with the space temperature. The combined signal is fed via the selector stage MIN to the PID control stage which provides after an adequate conversion an analog control signal 01 to the final control element formed by the servomotor.

All said functions are generated by a microprocessor, the central processing unit of which is shown schematically in FIG. 3, and is below described in detail.

By means of a keyboard and indicating unit MMI (man machine interface), not shown, and via an interface 301, a programmer has access to all registers and memories. Into a static parameter register 302 all fixed parameters such as rated values, time constants, proportional bands, etc. are inputted. A dynamic intermediate register 303 is used for intermediate storage of time dependent functions and said register contains dynamic parameters such as time delay, resets, etc. Configurator 304 provides, with its stored instructions, the arithmetic and logic unit of an interpreting computer 305 to achieve functions in that computer with which the input values, respectively the parameters are to be manipulated. The input values are inputted from an I/O module, not shown, into an input register 307 by command of an I/O control 306. After starting of the specific program given by configurator 304, the input values are transferred from input register 307 to X-register 308. The contents of X-register 308 thereafter are manipulated in computing unit 305 with functions and then is inputted in Y-register 309. As long as all columns of the functional diagram according to FIG. 2 and, therefore, all instructions in configurator 304 related to said functions are not finally processed, the values computed per column and stored in Y-register 309 are transferred back, line by line, into X-register 308 and said values are manipulated with the functions of the next column in computing unit 305. Only if all lines of the last column are finally processed, a transfer of the contents of Y-register 309 into output register 310 follows. Due to a command of I/O control 306, the values stored in output register 310 are transferred to the I/O module, not shown. Addressing of the different registers 303, 307, 310, 308 and 309 is achieved by intermediate counter 311, line and column counter 312, input counter 313, and output counter 314. Via status buffer memory 315, the different contents of the registers may be indicated on an indicating device, not shown.

Figure 3:
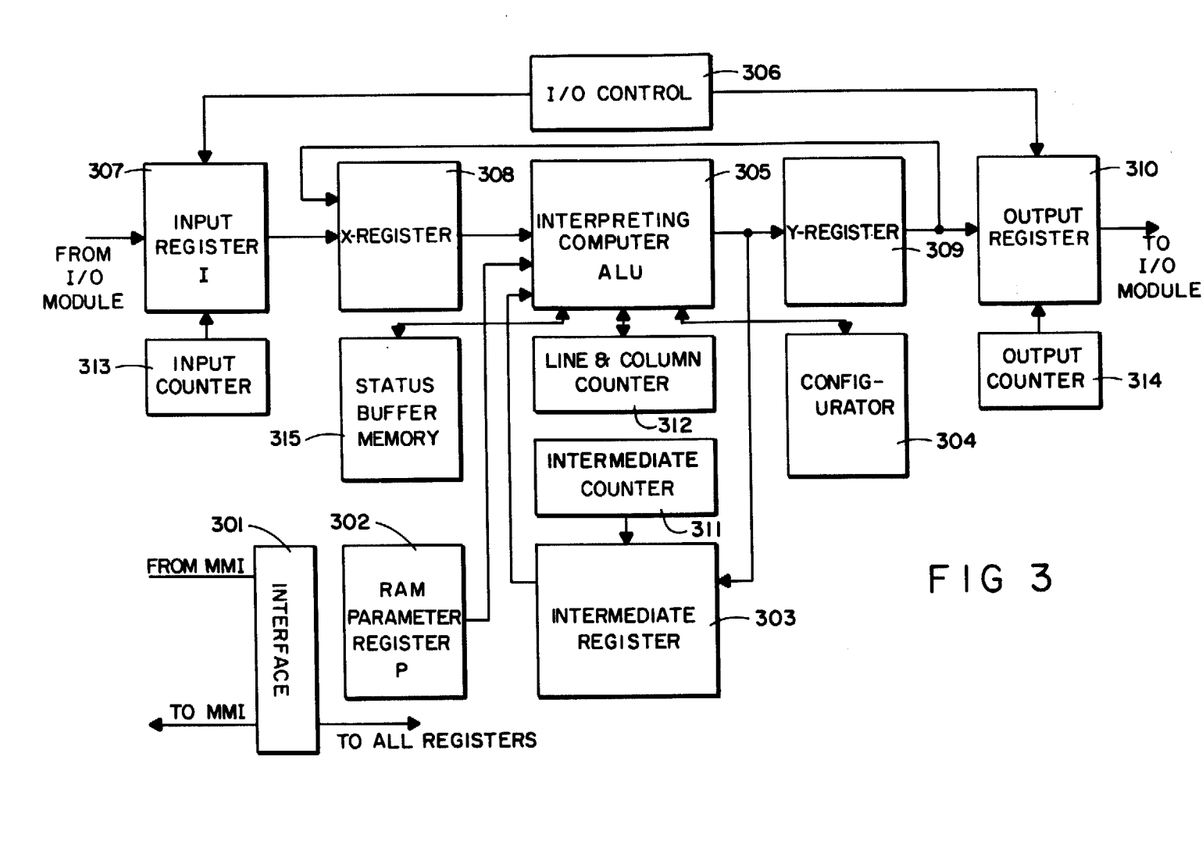
FIG. 3: A block diagram of the central processing unit of a microprocessor in the configuration according to the invention.
Figure 4A:
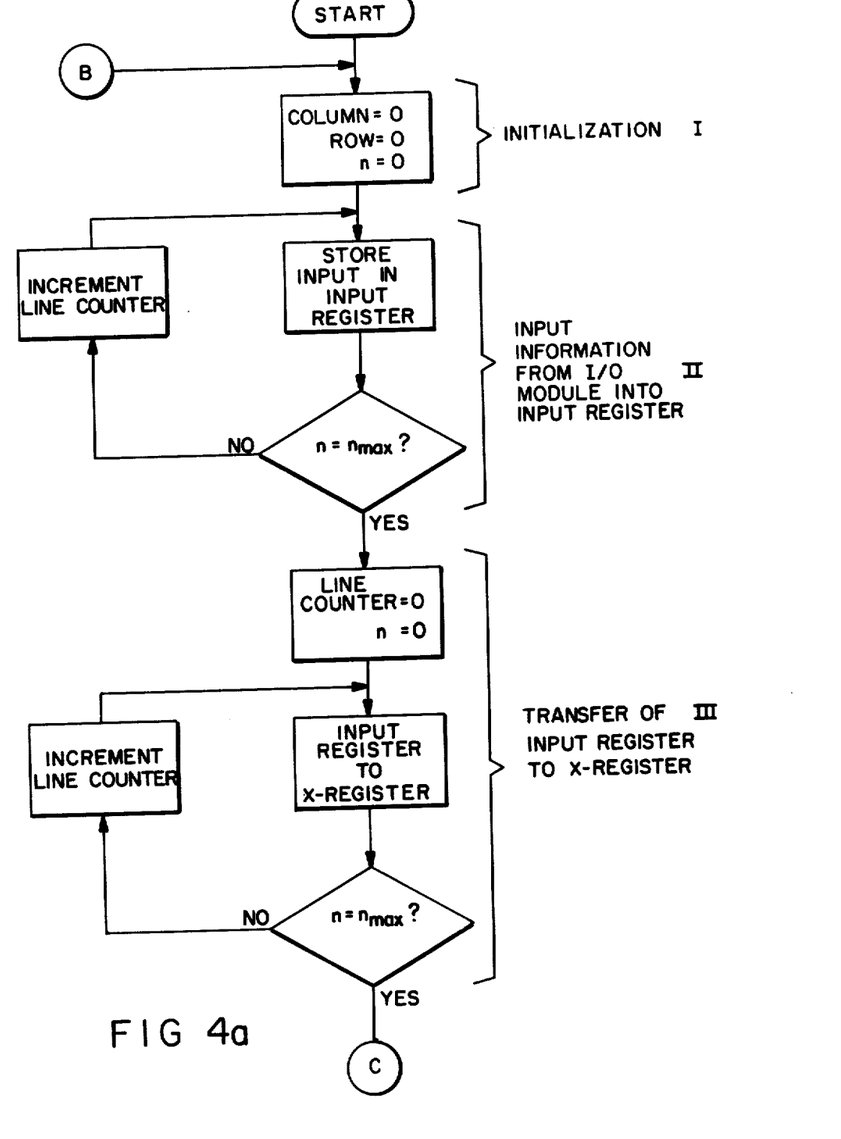
FIGS. 4a to 4c: A flow chart for explaining the operation of the microprocessor.
Figure 4B:
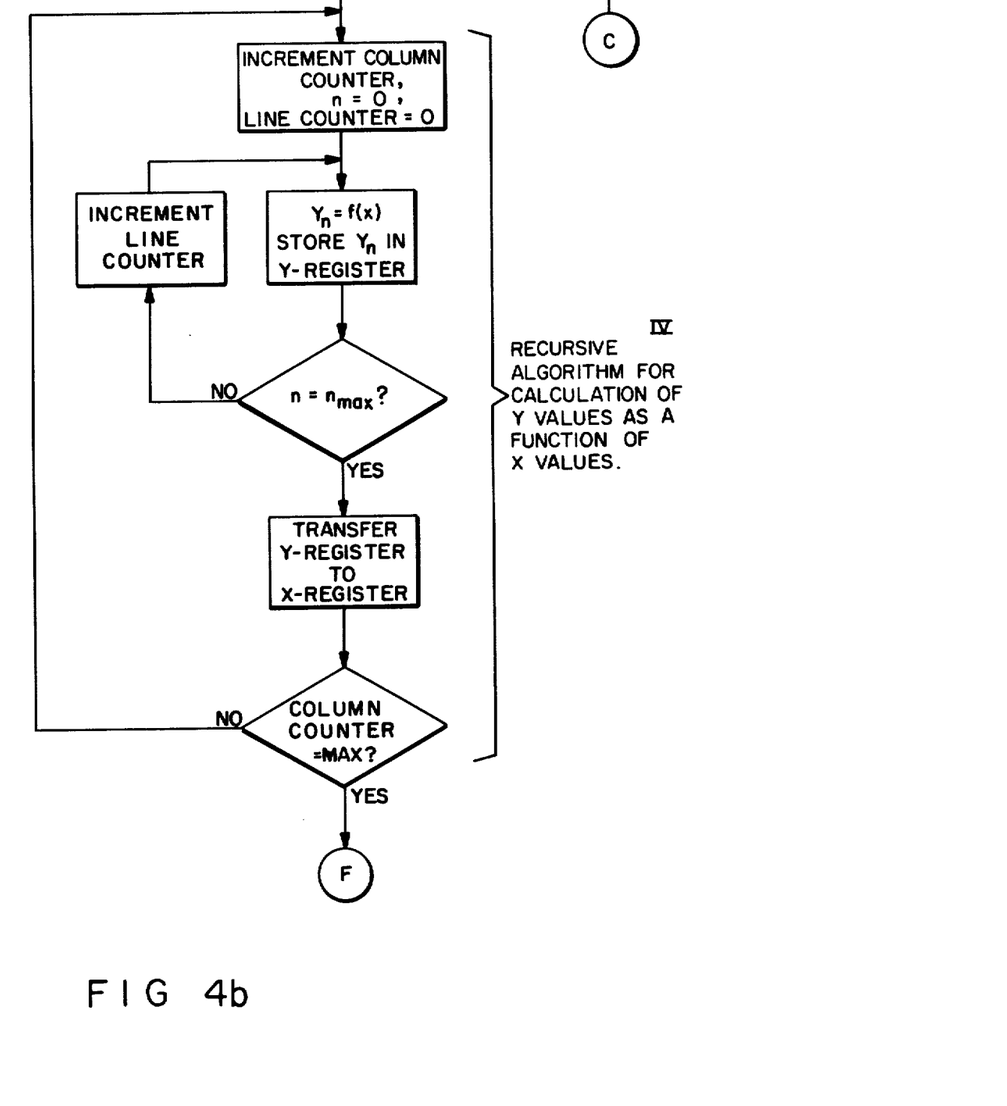
Figure 4C:
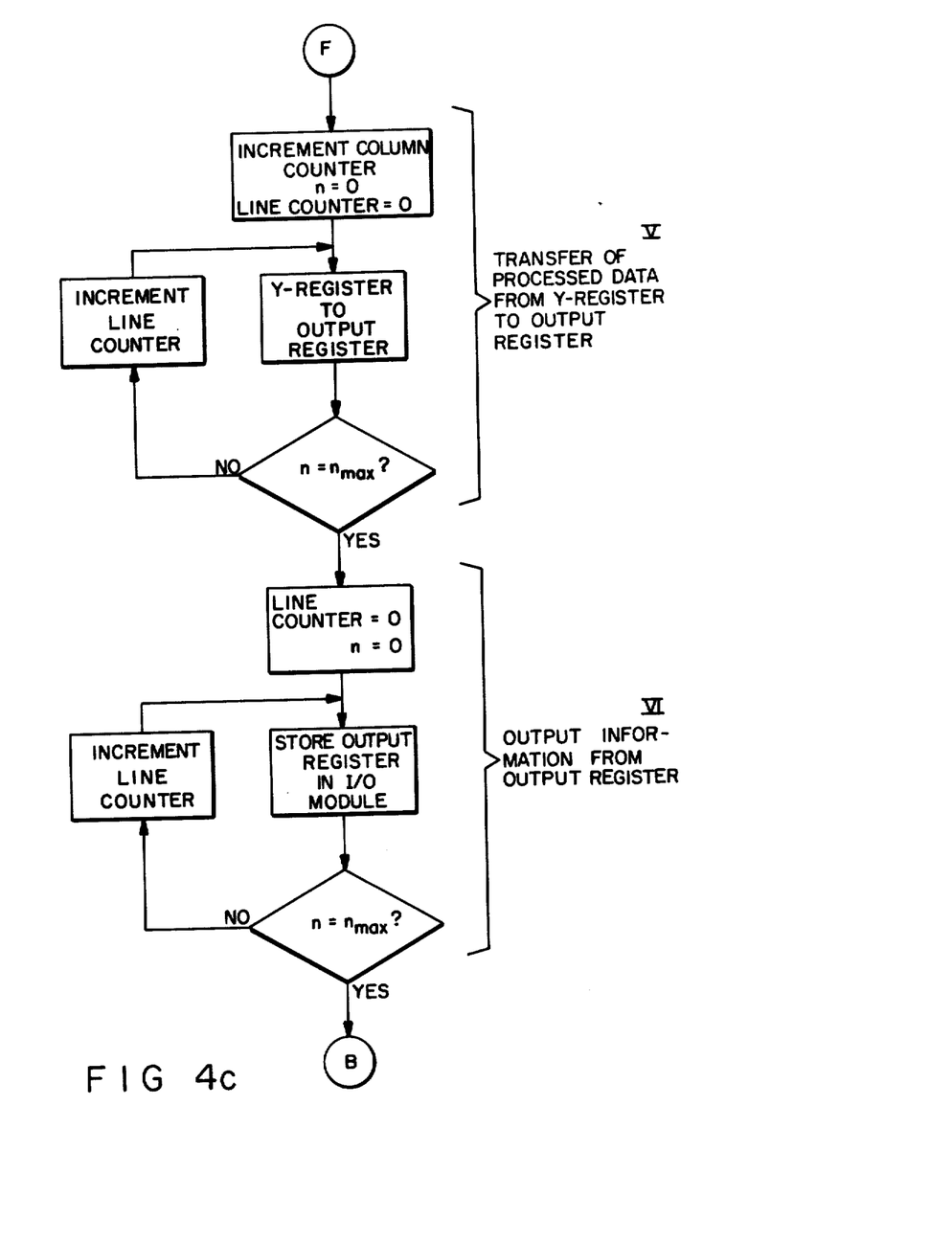

For explaining the computing process within the central computing unit according to FIG. 3, reference may be made to the flow chart shown in FIGS. 4a to 4c. As may be taken from said flow chart after the start of the program, the system is initialized in a first step I, wherein the column and line counter 312 is reset to the value zero. In next step II the input information of measuring sensors 108, 109 and 110 after a conversion into digital values, not shown, are transferred from the I/O module into the input register 307. This is achieved under control of input counter 313 with the count of said counter being incremented as long as the maximum number of lines according to the count of 3 is not attained. In the event when this count is attained, the contents of input register 307 are transferred into X-register 308 in next step III. Herewith the line counter is reset on zero, and its count is incremented as long as the maximum number of lines according to the count of 3 is not attained. In the event where this maximum line count is attained, the count of the column counter is incremented by 1 in step IV and the line counter is again reset to the value zero. Then the contents of X-register 308, respectively of parameter register 302, line by line is applied to interpreting computer 305 in order to be combined with the corresponding functions and thereafter to be inputted into Y-register 309. If this is done per column for each line of the X-register, respectively the parameter register, the contents of Y-register 309 are transferred back to X-register 308. Now the new values contained in the X-register are manipulated in interpreting computer 305 with the functions which are given by configurator 304. Again the results are stored line by line in Y-register 309. As long as the maximum column count of the column counter is not attained, that computing loop is recursively run through. In the event where the maximum count of the column counter is attained in next step IV, the computed final values stored in the Y-register are transferred to output register 310. This is achieved by setting the column counter on a count corresponding to the last column and by setting the line counter on the value zero. By incrementing the count of the line counter until attaining its maximum count for said column, the values of Y-register 309 are transferred into output register 310. If this is done in last step VI, the output information stored in output register 310 is transferred to an I/O module, not shown, due to a command of I/O control 306. This module then controls in a digital respectively analogous manner the steps of fan 104, respectively servomotor 106 (FIG. 1). The deliverance of said output information is also controlled by the line counter by setting first said counter on the value zero and afterwards incrementing said counter until attaining its maximum line count. The program loop then goes back to the initialization step I in order to start the whole computing process again.

The functional diagram is converted into corresponding regulating and control signals by the following program which is stored in configurator 304 within the central processing unit. Within the program shown below on the left side are written down the instructions and on the right side there is given an explanation of the function of said instructions. As far as the program contains the same instructions which are only executed with respect to other parameters or input values, an explanation is not given at the further appearance of said instructions within the program.

| | | | |
|---|---|---|---|
| BEGIN | | | Initialization; Column counter k=0, Line counter i=0 |
| | INP | 3 | 3 input values stored in input register 307 are transferred into X-register 308 |
| Y 1: | IDT | X1 | X1 is transferred without change by computer 305 from X-register 308 into Y-register 309 |
| Y 2: | PAR | P8 | Parameter P8 is transferred without change by computer 305 from parameter register 302 into Y-register 309 |
| Y 3: | TIME | | Time derived from the clock of the central processing unit is stored in Y-register 309 under use of intermediate register 303 |
| Y 4: | PAR | P9 | |
| Y 5: | IDT | X1 | |
| Y 6: | PAR | P2 | |
| Y 7: | IDT | X2 | |
| Y 8: | PAR | P3 | |
| Y10: | PAR | P6 | |
| Y11: | PAR | P7 | |
| Y12: | PAR | P4 | |
| Y13: | ITD | X3 | |
| | SLEV | 13 | All 13 values of the Y-register are transferred back into the X-register; jump into Column 3 |
| Y 2: | COMP | X3,X2 | Compare X3 (time) with X2 (P8); Y2=1, if $X3 \geq X2$ Y2=0, if $X3 < X2$ |
| Y 3: | COMP | X4,X3 | |
| | PONT | 6 | Line counter is set on Line 6 |
| Y 6: | COMP | X6,X5 | |
| | PONT | 8 | |
| Y 8: | COMP | X8,X7 | |
| Y 9: | LIN | X7,P16, X8,P17 | Scaling, respectively, proportional band Y9=X7P16+X8P17 |
| | PONT | 12 | |
| Y12: | LIN | X12,P16, X13,P17 | |
| | SLEV | 12 | Jump into Column 4 |
| | PONT | 2 | |
| Y 2: | MIN | X2,X3 | Y2=MIN (X2,X3); the smaller value of X2, respectively X3, is selected |
| | PONT | 8 | |
| Y 8: | SWI | X9,X10,X8 | Y8=Y9, if $X8 \geq 1$ Y8=X10, if $X8 < 1$ |
| | SLEV | 12 | Jump into Column 5 |
| | PONT | 2 | |
| Y 2: | MAX | X2,X6 | Y2=MAX (X2,X6); the greater value of X2, respectively, X6 is selected |
| Y 3: | PAR | P1 | |
| Y 4: | LIN | X8,P5 | |
| Y 5: | MUL | X11,X12 | Y5=X11×X12 |
| | SLEV | 5 | Jump into Column 6 |
| Y 1: | LIN | X1P16, X3P17, X4P17 | |
| | PONT | 3 | |
| Y 3: | MTIM | X2,P11,1 | A monoflop is set if X2 is switching from 0 to 1; P11 adjusts the switching time |
| | SLEV | 5 | Jump into Column 7 |
| | PONT | 3 | |
| Y 3: | NOT | X3,P12 | Y3=P12−X3 |
| Y 4: | MIN | X1,X5 | |
| | SLEV | 4 | Jump into Column 8 |
| | PONT | 2 | |
| Y 2: | MIN | X2,X3 | |
| Y 3: | PID | X4,P13, P14,P15 | PID-Function; $Y3^{i0} = Y3^{i0-1} + P13X4^{i0} + P14X4^{i0-1} + P15X4^{i0-2}$ |
| | SLEV | 3 | Jump into Column 9 |
| | OBIT | 1,X1 | Connection 1 = high level, if $X1 \geq 1$ Connection 1 = low level, if $X1 < 1$ |
| | OBIT | 2,X2 | Connection 2 = high level, if $X2 \geq 1$ Connection 2 = low level, if $X2 < 1$ |
| | AOP | 1 | A value within the Y-register is transferred to the output register to be outputted analog |

-continued

| END | | |
|---|---|---|
| Parameter Setting | | |
| P 1: | 21.00 | Space temperature set point °C. |
| P 2: | 15.00 | Night set point space temperature °C. |
| P 3: | 23.30 | Compensation start point °C. |
| P 4: | 17.00 | Low limit set point °C. |
| P 5: | 200.0 | Compensation ratio in % (Winter) |
| P 6: | 000.0 | Compensation ratio in % (Summer) |
| P 7: | 05.00 | Proportional band multiplier |
| P 8: | 06.00 | Fan start time (h/min.) |
| P 9: | 16.15 | Fan stop time (h/min.) |
| P10: | | Not used |
| P11: | 0010 | Delayed time (sec.) |
| P12: | 0001 | Constant |
| P13: | 0005 | Proportional band °C. |
| P14: | 0300 | Integral action (sec.) |
| P15: | 0050 | Derivative action (sec.) |

The embodiments of the invention in which an exclusive property or right is claimed are defined as follows:

1. A digital regulating and/or control system for providing a control output based upon a plurality of initial input values, said system receiving said initial input values line by line and for performing a plurality of functions upon said initial input values, said functions being performed line by line and column by column, said system comprising:

X-register means for storing line by line said initial input values;

parameter register means for storing parameters line by line and column by column, said system utilizing said parameters dependent upon the column containing said functions and said parameters;

Y-register means for storing on a column basis output values line by line; and, interpreting computer means for combining, if required, line by line and column by column said input values and said parameters according to predetermined program functions stored in a configurator, said interpreting computer means controlling said Y-register means to shift back the contents of said Y-register means to said X-register means if the maximum number of lines of each column is run through and if the maximum number of columns is not yet reached, said interpreting computer means controlling said Y-register means to deliver the contents of said Y-register means to an output if the maximum number of lines of the respective column is run through and if the maximum number of columns is reached.

2. The system according to claim 1 wherein said interpreting computer means comprises a line and column counter for addressing said X-register, said Y-register and said parameter register involved in the computing process.

3. The system according to claim 1 wherein said interpreting computer means comprises an intermediate register means for the temporary storage of time variable values during their calculation by means of said interpreting computer means.

4. The system according to claim 3 wherein said intermediate register means comprises an intermediate counter.

5. The system according to one of the claims 1 and 2-4 wherein said interpreting computer means comprises a status buffer memory for storing register contents to be indicated on an indicating device.

6. The system according to claim 5 wherein said X-register means comprises an input register addressed by an input counter for receiving variable input values supplied by an I/O module and wherein said Y-register means comprises an output register addressed by an output counter for receiving the computed values to be delivered by the I/O module.

7. The system according to one of the claims 1 and 2-4 wherein said X-register means comprises an input register addressed by an input counter for receiving variable input values supplied by an I/O module and wherein said Y-register means comprises an output register addressed by an output counter for receiving the computed values to be delivered by the I/O module.

8. A digital control system for controlling the temperature of a space within a building, said system having initial input values stored therein line by line, at least two of said initial input values being space temperature of the space within the building and outside temperature of the air outside the building, said system also having parameters stored therein, said parameters being stored line by line as well as column by column, said system performing functions on said input values and said parameters, said functions being arranged column by column and line by line, said parameters and input values resulting, after performance of said functions, in values which are both outputs of a column and corresponding inputs of the next succeeding column, said system comprising:

X-register means for storing line by line said initial input values;

parameter register means for storing parameters line by line and column by column, said system utilizing said parameters dependent upon the column containing said functions and said parameters;

Y-register means for storing on a column basis output values line by line; and, interpreting computer means for combining, if required, line by line and column by column said input values and said parameters according to predetermined program functions stored in a configurator, said interpreting computer means controlling said Y-register means to shift back the contents of said Y-register means to said X-register means if the maximum number of lines of each column is run through and if the maximum number of columns is not yet reached, said interpreting computer means controlling said Y-register means to deliver the contents of said Y-register means to an output if the maximum number of lines of the respective column is run through and if the maximum number of columns is reached.

9. The system according to claim 8 wherein said interpreting computer means comprises a line and column counter for addressing said X-register, said Y-register and said parameter register involved in the computing process.

10. The system according to claim 8 wherein said interpreting computer means comprises an intermediate register means for the temporary storage of time variable values during their calculation by means of said interpreting computer means.

11. The system according to claim 10 wherein said intermediate register means comprises an intermediate counter.

12. The system according to one of the claims 8 to 11 wherein said interpreting computer means comprises a status buffer memory for storing register contents to be indicated on an indicating device.

13. The system according to claim 12 wherein said X-register means comprises an input register addressed by an input counter for receiving variable input values supplied by an I/O module and wherein said Y-register means comprises an output register addressed by an output counter for receiving the computed values to be delivered by the I/O module.

14. The system according to one of the claims 8 to 11 wherein the X-register means comprises an input register addressed by an input counter for receiving variable input values supplied by an I/O module and wherein said Y-register means comprises an output register addressed by an output counter for receiving the computed values to be delivered by the I/O module.

* * * * *